United States Patent [19]

Baldauf et al.

[11] 3,862,407

[45] Jan. 21, 1975

[54] DECIMAL TO BINARY CONVERTER

[75] Inventors: Richard K. Baldauf, Greenbelt, Md.; Lawrence M. Leibowitz, Fairfax, Va.

[73] Assignee: The United States of America as represented by the Secretary of the Navy, Washington, D.C.

[22] Filed: Dec. 23, 1970

[21] Appl. No.: 100,933

[52] U.S. Cl. .......................... 235/155, 340/347 DD

[51] Int. Cl. ............................................... G06f 3/02

[58] Field of Search ............ 340/347, 365; 235/155, 235/154, 92

[56] References Cited

UNITED STATES PATENTS

| | | | |
|---|---|---|---|
| 2,729,811 | 1/1956 | Gloess | 235/155 X |
| 2,864,557 | 12/1958 | Hobbs | 340/347 X |
| 2,907,525 | 10/1959 | Hobbs et al. | 340/347 X |
| 3,323,527 | 6/1967 | Wu | 235/92 X |
| 3,590,223 | 6/1971 | Cake | 235/92 |

*Primary Examiner*—Charles D. Miller
*Attorney, Agent, or Firm*—R. S. Sciascia; Arthur L. Branning

[57] ABSTRACT

A decimal to binary converter which sequentially generates a train of pulses equal in number to each digit, of the decimal number to be converted, multiplied by its respective power of 10. These trains of pulses are then counted by a binary counter, the binary output of which is equivalent to the decimal input.

2 Claims, 1 Drawing Figure

Patented Jan. 21, 1975 3,862,407
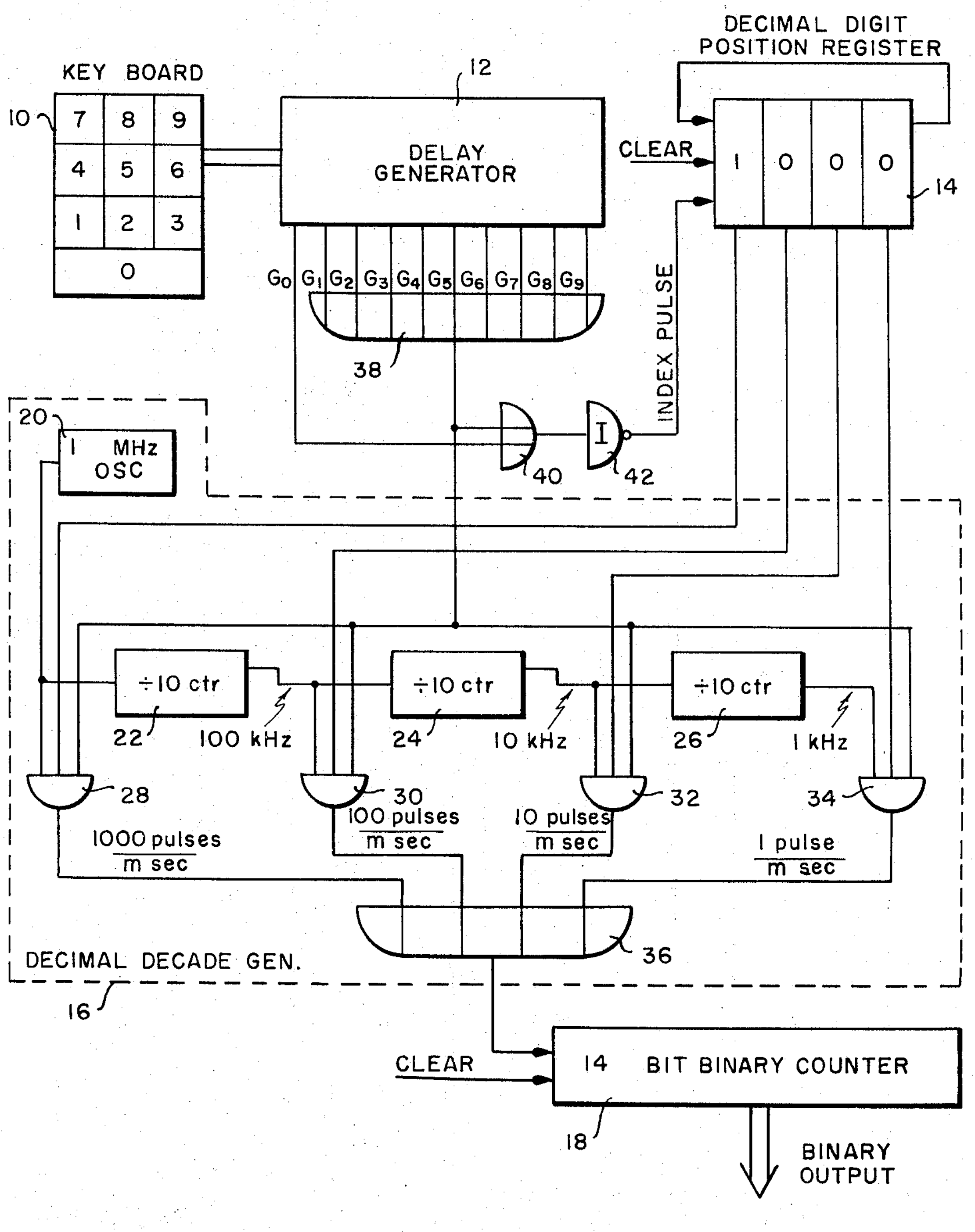
INVENTORS
RICHARD K. BALDAUF
LAWRENCE M. LEIBOWITZ
BY
ATTORNEY

DECIMAL TO BINARY CONVERTER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

In the interface of digital systems with the outside world, it is often necessary to convert a number presented in decimal form to natural binary form. An example would be the presentation of data to a digital system by means of a numeric keyboard.

Two direct approaches to performing a conversion of this type are logic network decoding and table look-up, both of which are based on code translation. Logic network decoding involves creating a Boolean function for each binary bit position with inputs corresponding to all decimal numbers (0 to 9) from each decimal digit position. Since these functions happen to be prime implicants they cannot be simplified. As a result, this method requires a large number of logic gates for even a limited range of decimal numbers.

The table look-up method requires storing the binary representation of all the numbers that are to be converted to binary. The numbers are then accessed by a unique set of inputs derived from the corresponding decimal number. This requires a storage device of capacity equal to the number of non-redundant conversions and leads to a large amount of storage if many conversions are necessary.

Another approach to decimal-to-binary conversion is based on the mathematical relation between these representations. Generally, in these methods the binary equivalent of the most significant digit is multiplied by 1010 (decimal ten) and the binary equivalent of the next decimal digit is added to the product. The procedure is repeated until the least significant digit is added.

These methods can be implemented using binary adders, shift registers, and other digital components.

SUMMARY OF THE INVENTION

The present invention provides a significant improvement over the circuits described above, in that it generates a train of pulses equal in number to each digit of the decimal number. These sequentially generated pulse trains are then added together by counting the total number of pulses in each of the pulse trains thereby producing the binary number which is equal to the original decimal number.

THE OBJECTS OF THE INVENTION

The general object of this invention is to provide an improved decimal to binary converter.

Another object is to effect a multiplication of each significant digit by powers of 10 to its proper magnitude, and these multiplied amounts are added together in binary to effect the conversion from decimal to binary.

Yet another object is a system which can convert directly from a decimal keyboard to binary with relatively few components and good reliability.

A further object of the invention is a technique for the conversion from decimal directly to binary which includes the steps of sequentially entering a decimal number for conversion in order of its magnitude, multiplying each decimal digit by powers of 10 to its respective magnitude and sequentially accumulating a binary number which is equivalent to the entered decimal number.

The FIGURE is a schematic diagram for the preferred embodiment of the invention.

DESCRIPTION OF THE DRAWING

The conversion method described here is based on the property that a decimal number is equal to the sum of each of its digits multiplied by a weighting factor, in powers of 10, depending upon the significance of the digit.

The keyboard to binary converter takes a decimal integer number entered by means of a keyboard, produces its binary equivalent, and stores it in a binary register. The number is entered in the conventional manner with the most significant digit entered first.

The converter is organized into several functional units; keyboard 10, delay generator 12, decimal digit position register 14, decimal decade generator 16 and binary counter 18. The FIGURE shows a converter designed to convert any decimal integer up to 9999.

Converter operation is based on the principle that for a given interval of time the number of pulses occurring in that interval is proportional to the frequency of those pulses. By the same principle, for a given frequency the number of pulses is proportional to the interval of observation. The frequencies used are related by factors of 10. Only nine intervals or delays are used, corresponding to the numbers 1 to 9.

The binary number is formed by adding together the binary representation of the components of the decimal number. Each component is equal to a decimal digit multiplied by its respective power of 10, and is represented by a train of pulses equal in number to the value of the component. The pulse trains are accumulated in a binary counter to give a binary representation of the component.

As an example, consider the conversion of the number 2345. The decimal components of this number are 2000, 300, 40, and 5. When the 2 button on the keyboard 10 is depressed the converter generates 2000 pulses and feeds them to the counter 18; when the 3 button is depressed, 300 pulses are generated and fed to the counter 18. In a similar manner, 40 and then 5 pulses are fed to the counter 18. The counter now contains the binary representation of the total number of pulses fed to it, or 2345. No pulses are entered into the counter when the 0 button is pushed but the position or decimal digit location is recorded as in the case of the non-zero digits to insure that the proper weight is given to each digit.

Leading zeros must be entered in their proper sequence but trailing zeros need not be entered. As an example, consider a number such as 120, one hundred twenty. Here a zero must be entered first to set the decimal digit position register 14 to the proper significant digit without the generation of any output from the decimal decade generator 16. A 1 entered on the keyboard causes the generation of 100 pulses and in a similar manner 20 pulses are generated and fed to the counter 18. Thus the binary counter will have counted 120 pulses which have been sequentially produced by the decimal decade generator 16.

By way of example in the FIGURE, a 1 MHz oscillator 20 is shown driving a series of decade counters 22,

24 and 26, the output of each being 1/10 the frequency of the input to the counter. Thus each of the AND gates 28, 30, 32 and 34 is constantly being supplied at one input with 1 MHz, 100 KHz, 10 KHz, and 1 KHz, respectively. Therefore, it is clear that upon the operation of each of the AND gates 28, 30, 32 and 34 these gates would produce trains of output pulses at the rates of 1000, 100, 10 and 1 pulses/m-sec when gated on by the decimal digit position register 14 and the delay generator 12. These trains of pulses representative of decimal components sequentially entered on the keyboard 10 would be passed by OR gate 36 to the (14 bit) binary counter 18 which would then contain the binary number equivalent of the decimal number entered on the keyboard 10. The delay generator 12 generates a pulse which is weighted by the decimal weight of the number entered on the keyboard, i.e., that is generator 12 supplies outputs which vary in length from 1 to 9 m-sec. corresponding to the decimal numbers 1 to 9. The delay generator 12 may be of the type as disclosed by the same inventors in application Ser. No. 80652, filed on Oct. 14, 1970. These delayed or stretched outputs G–$G_9$ are supplied to an OR gate 38 the output of which is coupled to AND gates 28, 30, 32 and 34 respectively to control the number of milliseconds that the individual AND gates are to be open. Which AND gate is to be open at any given time is determined by the divided pulse input from oscillator 20, the delay generator pulse and the output of the decimal digit position register 14. The position register 14 is normally set to operate to open the AND gate for the most significant decimal digit first, that is the 1000, 100, 10 and 1 significant digits respectively. The position register 14 could be a ring-counter set to have only one high or "one" state thereby allowing only one of the AND gates 28, 30, 32 and 34 to be open at one time. The shifting of the position register 14 is achieved by triggering the position register 14 to shift on the trailing edge of output of the delay generator 12. This is accomplished by OR gate 40 and inverter 42, which functions to invert the $G_0$ (zero) or the delayed (stretched) $G_1$–$G_9$ output. Thus on the completion of generating the train of pulses for the most significant digit the position register is shifted to the next significant digit and the decimal decade generator is ready to generate pulses in accordance with the delayed or stretched output from the delay generator.

In summary an oscillator is fed to a series of decade counters. The output frequency of each decade counter is exactly 1/10 of its input frequency. For an interval of one ms the number of pulses observed at each decade counter output is respectively 1000, 100, 10, and 1. Each output is fed to an AND gate. The second input to each of the four AND gates is one of the four outputs of the position register. Only one of the outputs is high, or a logical 1, at any time. The location of this 1 corresponds to the position of the next decimal digit to be entered. When this input to one of the AND gates is low, the input from the corresponding decade counter is inhibited. The third input to each of the four AND gates is the output of the delay generator. This input consists of a positive pulse with a duration of from 1 to 9 ms, dependng upon which button is depressed.

Two conditions at any one of the AND gates are necessary to allow a train of pulses to pass through to the OR gate: the inputs from the digit position register and from tne delay generator must both be high. When these conditons exist, a train of pulses is fed through the OR gate to the 14-bit binary counter. The number of pulses is equal to the product of the corresponding decade counter output frequency and the duration of the positive pulse from the delay generator.

After each pulse train the negative-going edge of the delay generator pulse is inverted and fed to the position register to shift the 1, or high, to the next stage. This index pulse causes a high to be sent to the proper AND gate where the correct frequency for the corresponding digit is available. Note that when the 0 button is depressed, the signal on the $G_0$ in the figure is used only to index the position register. Also, at the time the converter is turned on, a reset or clear pulse is needed to insure that the position register contains the binary number 1000 and that the 14-bit binary counter contains all 0's.

There are several significant features. First, the delay generator can be implemented with a variable length counter so that the delays are proportional to the oscillator frequency. This makes the number of pulses independent of the oscillator frequency. Second, the input format permits entering the numbers in the conventional manner with the most significant digit first.

Obviously many modifications and variations of the present invention are possible in the light of the above teachings. It is therefore to be understood that within the scope of the appended claims the invention may be practiced otherwise than as specifically described.

What is claimed and desired to be secured by Letters Patent of the United States is:

1. A decimal number to natural binary number converter comprising:

input means for sequentially entering a decimal number to be converted;

means coupled to said input means for generating sequential trains of pulses the number of pulses in each of said trains of pulses being equivalent to one of the decimal digits of said decimal number, said generating means including at least two pulse generators whose output frequencies are related by a decimal multiple of ten and the output of each of said pulse generators being representative of a different significant digit of said decimal number;

binary adding means coupled to said generating means for totaling all the pulses in each of said trains of pulses, wherein the totaled number is the binary equivalent to said decimal number entered into said input means.

2. The converter of claim 1 wherein logic means is employed to sequentially control said generators so that only the output of one generator is coupled to said binary adding means at any one time.

* * * * *